(12) United States Patent
Mikhemar et al.

(10) Patent No.: US 8,868,018 B2
(45) Date of Patent: Oct. 21, 2014

(54) RECIPROCAL MIXING NOISE CANCELLATION SYSTEM

(71) Applicant: Broadcom Corporation, Irvine, CA (US)

(72) Inventors: Mohyee Mikhemar, Aliso Viejo, CA (US); David Murphy, Costa Mesa, CA (US); Ahmad Mirzaei, Orlando, FL (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1 day.

(21) Appl. No.: 13/769,209

(22) Filed: Feb. 15, 2013

(65) Prior Publication Data

US 2014/0073280 A1 Mar. 13, 2014

Related U.S. Application Data (60) Provisional application No. 61/699,214, filed on Sep. 10, 2012.

(51) Int. Cl.
*H04B 1/10* (2006.01)
*H04B 10/69* (2013.01)

(52) U.S. Cl.
CPC ............... *H04B 1/10* (2013.01); *H04B 1/1036* (2013.01); *H04B 10/6973* (2013.01); *H04B 2001/1063* (2013.01)
USPC ............ 455/296; 455/303; 455/306; 455/308

(58) Field of Classification Search
CPC ........ H04B 1/10; H04B 1/1036; H04B 1/123; H04B 10/697; H04B 10/6973; H04B 2001/10; H04B 2001/1063; H04B 2001/7107

USPC .......................................... 455/296, 303–311
See application file for complete search history.

(56) References Cited

U.S. PATENT DOCUMENTS

| | | | | |
|---|---|---|---|---|
| 3,911,366 A | * | 10/1975 | Baghdady | 455/206 |
| 4,667,225 A | * | 5/1987 | Kanda | 348/624 |
| 4,739,518 A | * | 4/1988 | Bickley et al. | 455/296 |
| 4,931,743 A | * | 6/1990 | Fukuda et al. | 327/551 |
| 5,136,386 A | * | 8/1992 | Okada et al. | 348/622 |
| 5,379,445 A | * | 1/1995 | Arnstein et al. | 455/13.4 |
| 5,438,424 A | * | 8/1995 | Ozaki et al. | 386/269 |
| 5,710,996 A | * | 1/1998 | Kajimoto et al. | 455/309 |
| 5,742,900 A | * | 4/1998 | Arnstein et al. | 455/296 |
| 6,021,156 A | * | 2/2000 | Wagner | 375/148 |
| 6,714,775 B1 | * | 3/2004 | Miller | 455/296 |
| 7,058,368 B2 | * | 6/2006 | Nicholls et al. | 455/114.2 |
| 2010/0233984 A1 | * | 9/2010 | Yang et al. | 455/307 |

* cited by examiner

*Primary Examiner* — Duc M Nguyen
(74) *Attorney, Agent, or Firm* — McDermott Will & Emery LLP (57) ABSTRACT

A system for cancellation of a reciprocal-mixing noise may comprise a down-converter mixer that may be configured to down convert a radio-frequency (RF) signal and to generate a baseband signal. The RF signal may include a desired signal and a blocker signal. A first signal path may be configured to receive the baseband signal and to generate a first signal. A second signal path may be configured to receive the baseband signal and to generate a second signal. A subtraction module may be configured to subtract the second signal from the first signal and to generate an output signal. The second signal may comprise the reciprocal-mixing noise, and the output signal may comprise the desired signal substantially free from the reciprocal-mixing noise.

20 Claims, 8 Drawing Sheets

RECIPROCAL MIXING NOISE CANCELLATION SYSTEM

CROSS-REFERENCES TO RELATED APPLICATIONS

The present application claims the benefit of priority from U.S. Provisional Patent Application Ser. No. 61/699,214, entitled, "RECIPROCAL MIXING CANCELLATION SYSTEM," filed on Sep. 10, 2012, which is hereby incorporated by reference in its entirety for all purposes.

TECHNICAL FIELD

The present description relates generally to radio frequency (RF) communications, and more particularly, but not exclusively, to a reciprocal mixing noise cancellation system.

BACKGROUND

The airwaves may be crowded with wireless signals, e.g., cellular signals, Wi-Fi signals, and/or other wireless signals. Accordingly, radio receivers may need to tolerate large blocker signals, e.g. unwanted signals that may interfere with a wanted signal. In addition, during down-conversion in a receiver, reciprocal mixing of the phase noise of a local oscillator (LO) with an unwanted blocker signal may deposit additive noise on top of the wanted signal. The undesirable effects of reciprocal mixing can be mitigated, in some instances, by filtering the unwanted blocker signal prior to down-conversion using sharp radio frequency (RF) filters. However, the addition of those RF filters may come at the expense of power, cost, and/or area. The undesirable effects of reciprocal mixing may also be mitigated by implementing oscillators that have minimal phase noise, such as LC-oscillators. However, the phase noise improvement of an LC-oscillator may also come at the expense of power, cost, and/or area.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1A:
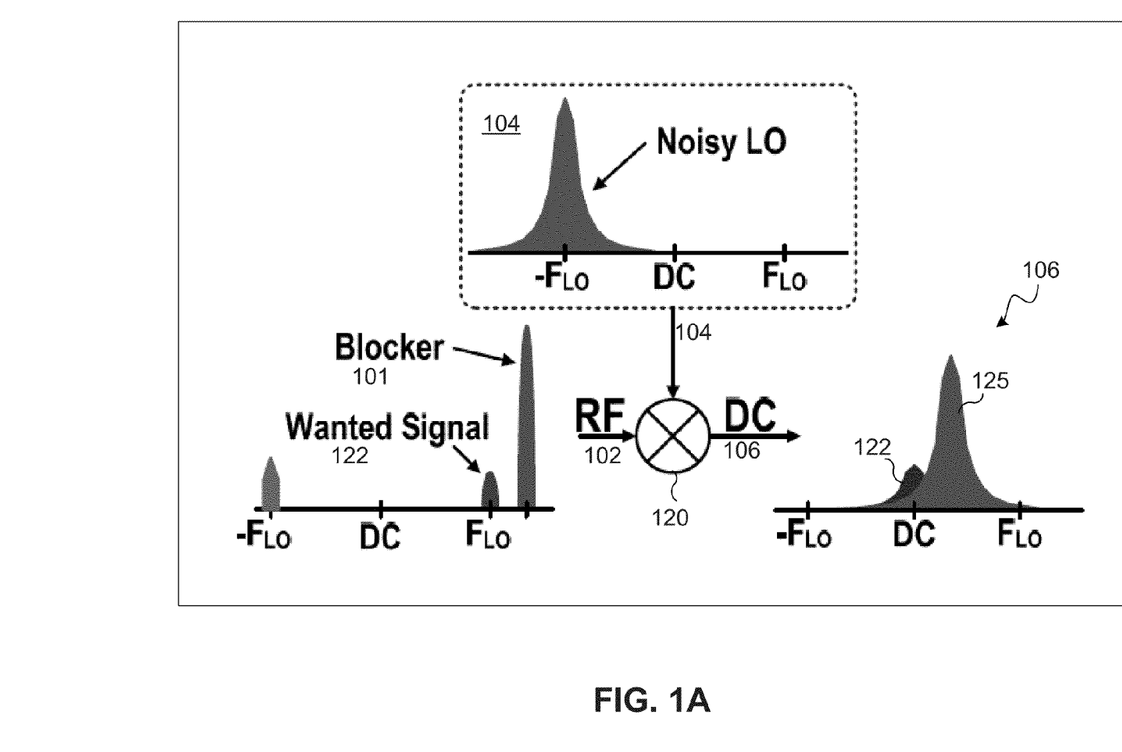
FIGS. 1A-1B illustrate example down-conversion mixing of a radio-frequency (RF) signal with a noisy local oscillator (LO) causing generation of reciprocal mixing noise.
Figure 1B:
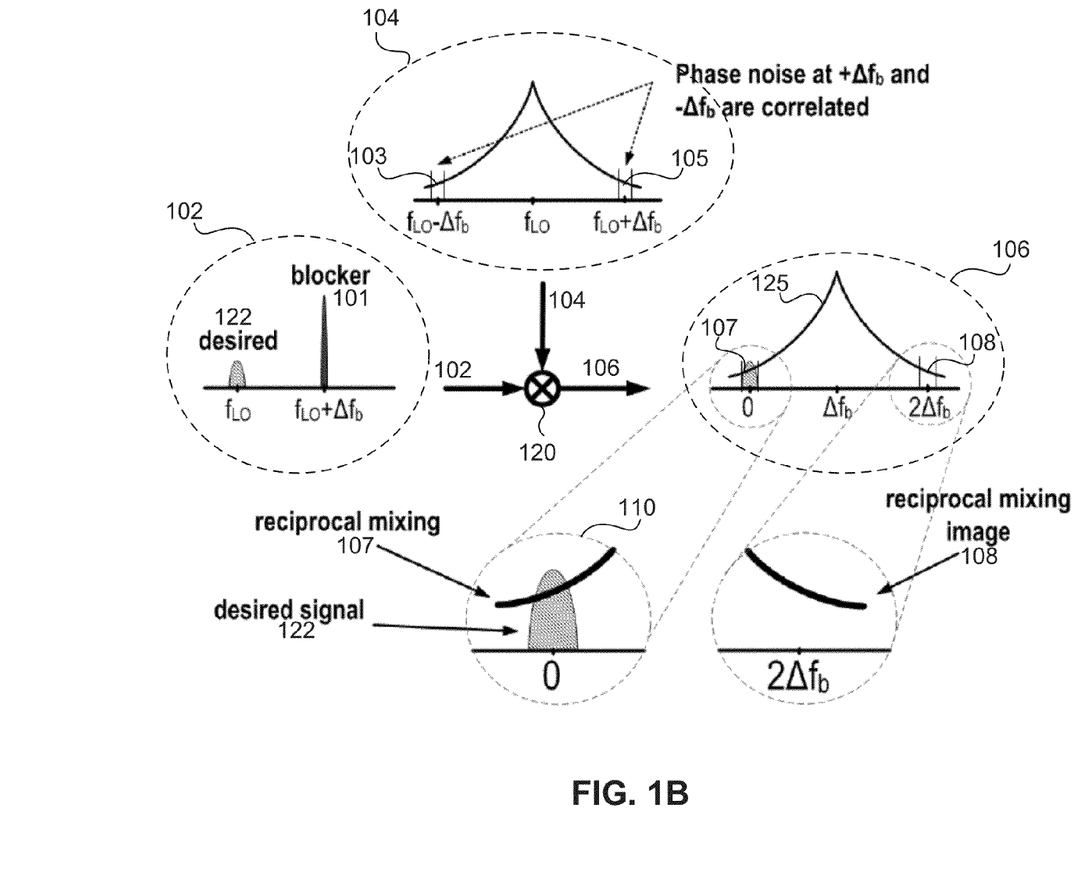

FIGS. 1A-1B illustrate example down-conversion mixing of a radio-frequency (RF) signal 102 with a noisy local oscillator (LO) 104 causing generation of reciprocal mixing noise. A down-conversion mixer 120 may receive the RF signal 102 and mix the RF signal 102 with the LO signal 104 to generate a baseband signal 106. The RF signal 102 may include a wanted signal 122 (e.g., desired signal) at an operating frequency of the LO (e.g., LO frequency, $F_{LO}$), a corresponding image signal at a negative frequency, $-F_{LO}$, and a narrow band blocker signal 101 (e.g., an unwanted signal) at an offset from the $F_{LO}$. The LO signal 104 may be a noisy LO signal with a symmetrical phase noise frequency spectrum centered at $F_{LO}$ (and also with an image spectrum at $-F_{LO}$, which is shown in FIG. 1A). The down-conversion mixer 120 may down convert the RF signal 102 to generate the baseband signal 106 at near zero frequencies (e.g., DC).

Ideally, if the LO signal 104 was noiseless, one would expect the baseband signal 106 to be a replica of the RF signal 102 (i.e., the positive frequency portion of the signal) shifted down in frequency, by an amount equal to $F_{LO}$, to DC. In practice, however, the other frequencies of the phase noise frequency spectrum of the noisy LO signal 104 may also mix with the narrow blocker 101 to generate a wideband modulated blocker signal 125 with a symmetrical reciprocal-mixing profile. The problem with this undesirable mixing is that a tail of the modulated blocker signal 125 can superimpose the wanted signal 122 (at around DC) to deposit additional noise on the wanted signal 122. The subject technology may provide a method and system for cancellation of the reciprocal mixing noise, as disclosed herein. The disclosed mixed signal reciprocal-mixing noise cancellation technique leads to substantial reciprocal-mixing noise figure improvement independent of the LO phase noise. Using the disclosed technique, the wanted signal can be recovered substantially free from to the reciprocal mixing noise, at significant advantage with respect to the existing solutions.

As shown in FIG. 1B, the RF signal 102, when mixed with the noisy LO signal 104 with an upper sideband 105 and a lower sideband 103, may generate the baseband signal 106 including the modulated blocker signal 125 with corresponding upper and lower sidebands 108 and 107. The symmetrical reciprocal-mixing profile of the modulated blocker signal 125, as discussed above, arises from reciprocal mixing of various frequencies of the phase noise frequency spectrum of the noisy LO 104 with the blocker signal 101. The subject technology may rely on the fact that the modulated blocker signal 125, similar to the noisy LO signal 104, has a symmetrical reciprocal-mixing profile, so that the upper and lower sidebands (e.g., 105 and 103, and 108 and 107) are completely correlated. The reciprocal-mixing profile of the modulated blocker signal 125 may extend to around DC, so that lower sideband 107 may be in-band, thus indistinguishable from the desired signal 122, as shown in the blown-up portion 110.

On the contrary, if the image of the in-band reciprocal-mixing located at $2\Delta f_b$ (e.g., the upper sideband 108) is frequency shifted, and properly scaled to match the in-band reciprocal mixing (e.g., the lower sideband 107), a simple subtraction may result in a nearly perfect cancellation. To protect the desired signal, an auxiliary path may be added to create the reciprocal-mixing replica for cancellation, as discussed in more detail herein. After proper subtraction the reciprocal-mixing can be removed by the noise of the auxiliary path which is independent of blocker power and LO phase noise.

Figure 2:
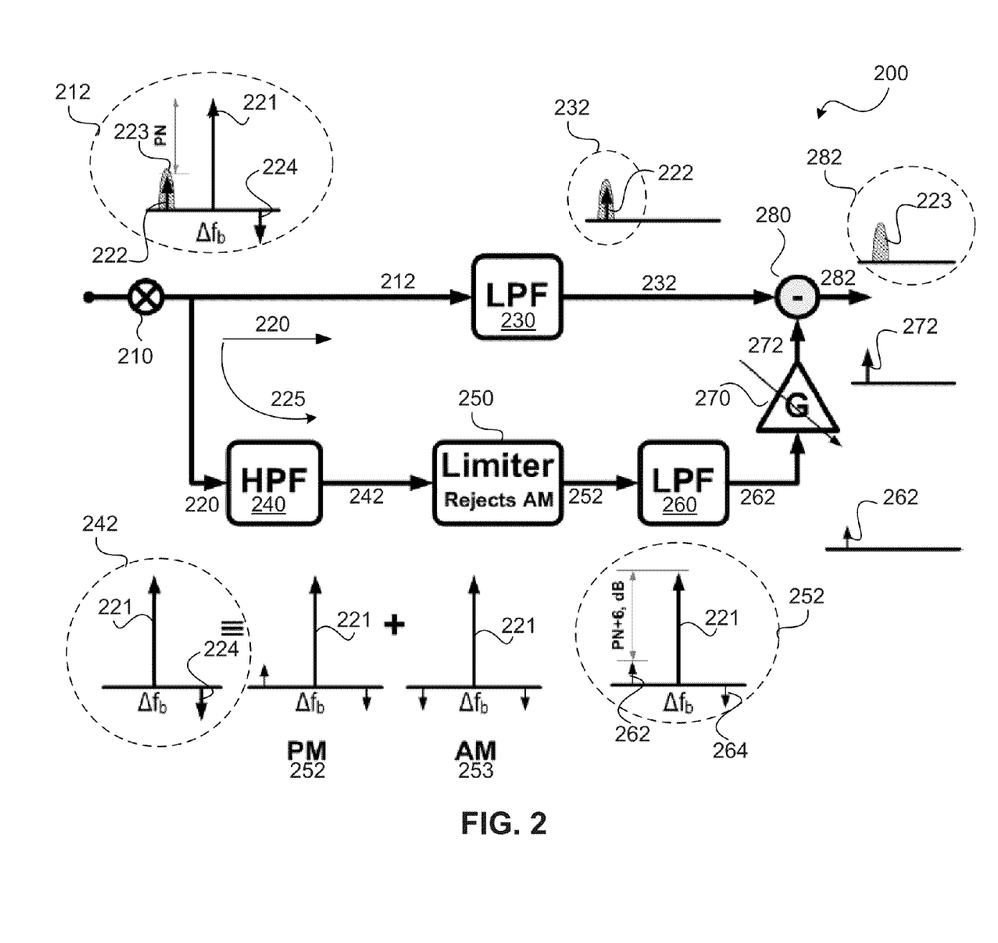
FIG. 2 illustrates an example system for cancellation of reciprocal mixing noise of a receiver in accordance with one or more implementations.

FIG. 2 illustrates an example system 200 for cancellation of reciprocal mixing noise of a receiver in accordance with one or more implementations of the subject technology. The system 200 may include a down-converter mixer 210, a main (e.g., a first) signal path signal 220, an auxiliary (e.g., a second) signal path 225, and a subtraction module 280. The main signal path 220 may include a low-pass filter (LPF) 230. The auxiliary signal path 225 may include a high-pass filter (HPF) 240, a limiter circuit 250, an LPF 260, and a variable gain stage 270.

A spectrum of an output signal 212 of the receiver down-conversion mixer 210 may include a desired signal 223 at DC, a blocker signal 221 at $\Delta f_b$, an in-band spur signal 222 on top of the desired signal 223, and an image spur signal 224 at approximately $2\Delta f_b$. In the implementation 200, for simpler illustration, the reciprocal mixing noise (e.g., 107 of FIG. 1B) and its image (e.g., 108 of FIG. 1B) are represented as the spur signal 222 and the spur image signal 224, respectively. At the output of the mixer 210, a low-pass/high-pass arrangement (e.g., LPF 230 and HPF 240) may split the output signal 212, between the main path 220 and the auxiliary path 225. The low-frequency spur signal 222 and the desired signal 223 can pass through the LPF 230 of the main path as the first signal 232, while the blocker signal 221 and the spur image signal 224 are diverted in the auxiliary path 225 as a first-filtered signal 242 to the limiter circuit 250. As illustrated in FIG. 2, the spur image signal 224 can be treated as a single-sideband (SSB) signal with respect to the down-converted blocker signal 221, which can then be represented as the sum of equal phase-modulation (PM) sidebands 252 and amplitude-modulation (AM) sidebands 253.

When applied to the limiter circuit 250, the AM sidebands 253 may be rejected but the PM sidebands 252 can be preserved. Therefore, in the output signal 252 of the limiter circuit 250, the in-band spur signal 262 and a spur image signal 264, with lower magnitudes (e.g., half) as compared to their magnitudes in the output signal 212, have been restored. The limiter circuit 250 may be followed by the LPF 260 that is configured to reject the blocker signal 221 and the spur image signal 264, and pass the spur signal 262 to the variable gain stage 270. The spur signal 262 (e.g., the reciprocal mixing noise) can be properly scaled by the variable gain stage 270 before the final subtraction. The scaling factor G of the gain stage 270 may be a complex number so that the scaling factor G can compensate for phase shifts resulting from the HPF 240 and the LPF 260. This can be conveniently implemented by combining the quadrature baseband signals with the appropriate weights. The output signal 282 at the output of the subtraction module 280 may be substantially free from the reciprocal-mixing noise and may include only the desired signal 223, as the spur signal 222 (e.g., reciprocal-mixing noise) is canceled by the scaled spur image signal 272 of the auxiliary path 225.

Although the example shown and discussed above considered reciprocal mixing due to a spur (e.g., the spur signal 222 and the spur image signal 224), the result may be equally valid for reciprocal-mixing noise caused by the phase noise spectrum. The only difference in the case of the phase-noise generated reciprocal-mixing is the folding of higher order images caused by the odd-order nonlinearities of the limiter circuit 250, which have to be cancelled as discussed below.

Figure 3:
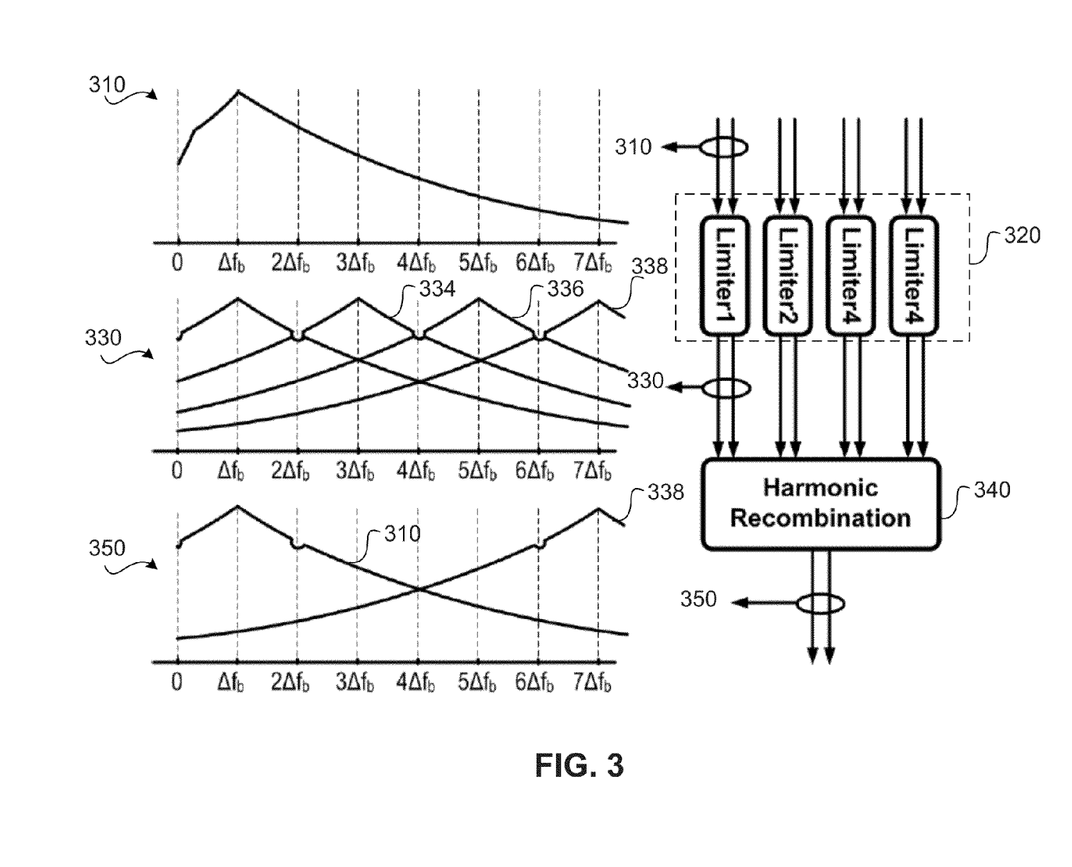
FIG. 3 illustrates an example multi-phase approach for cancellation of higher order harmonics in the system of FIG. 2 in accordance with one or more implementations.

FIG. 3 illustrates an example multi-phase approach for cancellation of higher order harmonics in the system of FIG. 2 in accordance with one or more implementations of the subject technology. When instead of the spur signals 222 and 224 of FIG. 2, the reciprocal-mixing profile 310 at $\Delta f_b$ is applied to the limiter circuit 250 of FIG. 2, the output 330 of the limiter circuit 250 (e.g., one of the limiters of the group 320) may include the fundamental reciprocal-mixing around $\Delta f_b$ with the in-band reciprocal-mixing restored from the image at $2\Delta f_b$, as well as replicas of the fundamental at all odd harmonics (e.g., 334, 336, and 338). The reciprocal-mixing skirts of the higher-order replicas may cause an in-band distortion which may not correlate with reciprocal-mixing of the main path. Considering a simple $1/f^2$ phase noise roll-off, it is understood that the harmonic distortion may limit the cancellation of the reciprocal-mixing noise to about 6 dB.

Since most blocker tolerant receivers may use an 8-phase scheme, the issue of harmonic distortions may be mitigated by exploiting an 8-phase mixer (e.g., to replace mixer 210 of FIG. 2) along with a harmonic recombination circuit 340 (FIG. 3). The limiter circuit 250 of FIG. 2 may be replaced by the group 320 of limiters including, for example, four limiters. The harmonic recombination of the output signals (e.g., 330) of the four limiters may cancel the $3_{rd}$ and $5_{th}$ harmonics, leaving in the output signal 350, the $7_{th}$ harmonic 338 as the first dominant odd harmonic. In theory, the magnitude of the $7_{th}$ harmonic 338 may be 15.6 dB below the level of the in-band reciprocal-mixing (e.g., 310). In practice, attenuation of the $7_{th}$ harmonic 338 and other higher-order harmonics may be even greater due to additional filtering at the mixer output and the internal nodes of the limiters.

Figure 4:
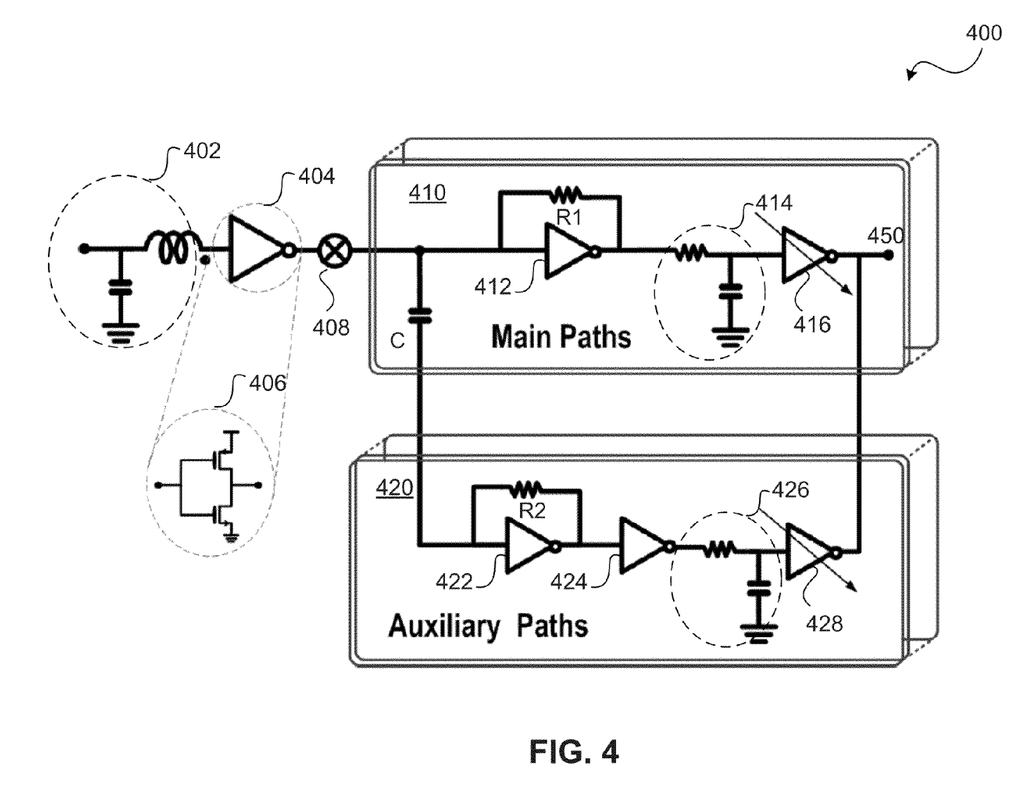
FIG. 4 illustrates an example inverter-based implementation of the system of FIG. 2 in accordance with one or more implementations.

FIG. 4 illustrates an example inverter-based implementation 400 of the system 200 of FIG. 2 in accordance with one or more implementations of the subject technology. In the implementation 400, a receiver may include a band-pass filter 402, an inverter-based low-noise transconductance amplifier (TCA) 404, exemplified by a CMOS inverter circuit 406, and followed by a multi-phase (e.g., 8-phase) passive mixer 408. A main path 410 may include an inverter-based trans-impedance amplifier (TIA) 412 with a feedback resistor R1, an LPF 414 (e.g., an on-chip RC LPF), and a variable gain stage 416. The TIA 412 may convert the current signal of the mixer 408 to a voltage signal that is filtered by the LPF 414 and suitably scaled by the gain stage 416, before being combined by a signal provided by an auxiliary path 420. The gain stage 416 may be a digitally controlled variable gain TCA.

The Auxiliary path 420 may include a capacitor C which steers the higher frequency out-of-band components of the current signal of the mixer 408 to an inverter-based TIA 422 with a feedback resistor R2 to convert the current signal to a voltage signal. The voltage signal generated by the TIA 422 is directed to a limiter circuit (e.g., a hard-limiting inverter stage) 424 to ensure proper restoration of the in-band reciprocal noise. The output signal of the limiter circuit 424 is low-pass filtered by an LPF 426 (e.g., an on-chip RC LPF) to attenuate the blocker, before it is applied to the gain stage 428.

The gain stage 428 may be a digitally controlled variable gain TCA, for example, a replica of the gain stage 416 of the main path 410. The output of the gain stage 428 may be an inverted replica of the reciprocal-mixing noise that when combined with the output signal of the gain stage 416, can cancel out with the reciprocal-mixing noise in that signal and result in the desired signal (e.g., 223 of FIG. 2) at the output port 450.

In one or more aspects of the subject technology, the inverters used in the implementation 400 may include CMOS inverters implemented, for example, in a 40 nm CMOS technology. The P and N transistors of the CMOS inverters may be sized properly to equalize the transconductance of both devices and hence minimizes the even-order nonlinearity. The inverter currents may be optimized for noise performance. The value of the feedback resistors may be critical for proper operation, it can be large enough to maximize the gain and to relax the noise requirement of subsequent stages, but not too large to increase the TIA input impedance or to limit the TIA bandwidth. The TIA bandwidth can be wide enough to pass the reciprocal-mixing image at $2\Delta f_b$. Although there is no explicit capacitor around the TIAs, the gate-to-drain capacitances of the inverter devices and the input capacitance of the next stage may limit the bandwidth. The auxiliary path 420 including the TIA 422, the limiter circuit 424, and the variable gain stage 428 may consume 3 mA per branch. It is understood that since the mixer 408 may be a multi-phase (e.g., 8-phase) mixer, the main and auxiliary paths 410 and 420 may each include multiple branches (e.g., 4 differential branches).

Figure 5A:
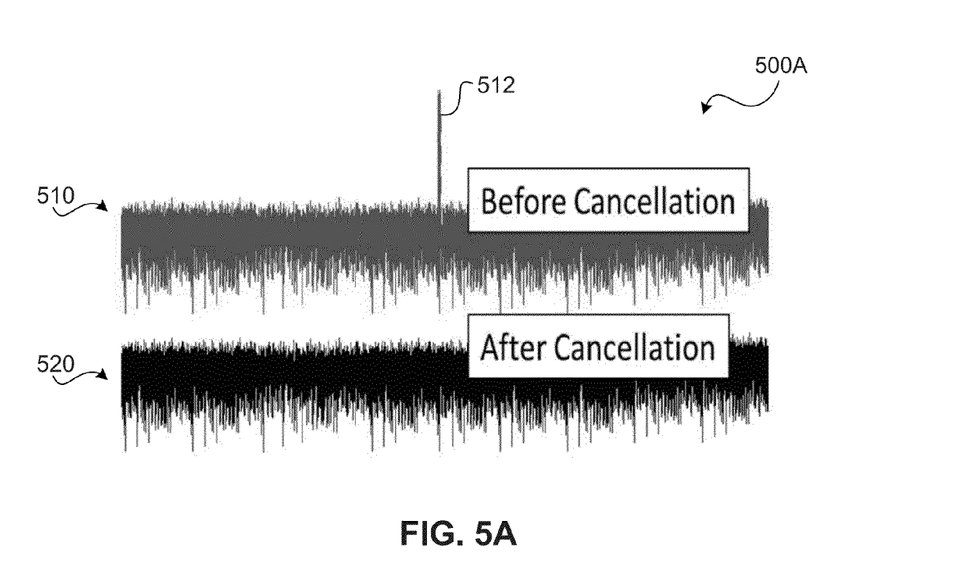
FIG. 5A illustrates example output spectra of the implementation of FIG. 4 in accordance with one or more implementations.

FIG. 5A illustrates example output spectra 500A of the implementation 400 of FIG. 4 in accordance with one or more implementations of the subject technology. To evaluate the performance of the implementation 400, the receiver may be tuned to test signal at 1 GHz and a continuous wave (CW) blocker signal may be applied at 20 MHz away from the test signal. A spur (e.g., 512) may be injected to the LO at the frequency of 20.1 MHz. The output spectrum of the receiver before and after the cancellation of the reciprocal-mixing are shown in plots 510 and 520, respectively. The spur 512 is effectively filtered down by 25 dB.

Figure 5B:
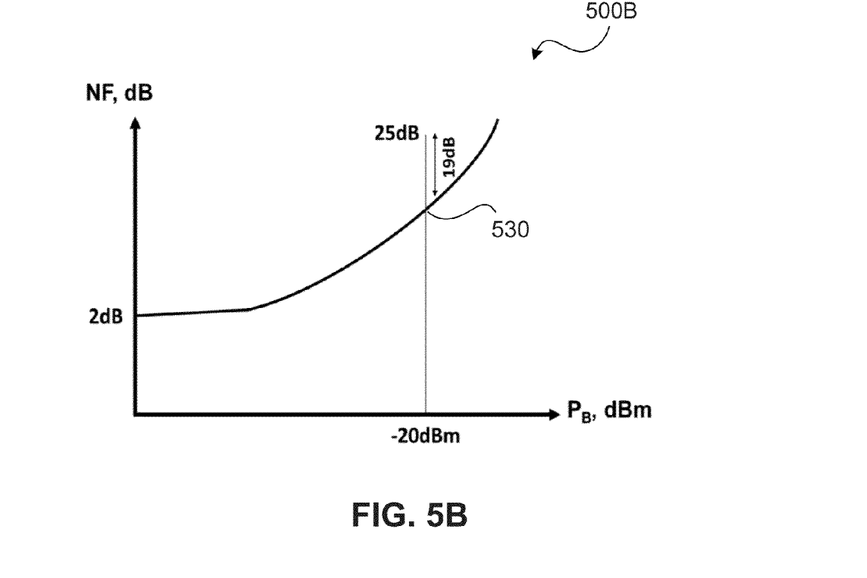
FIG. 5B illustrates an example plot of noise figure versus blocker power of the system of FIG. 4 in accordance with one or more implementations.

FIG. 5B illustrates an example plot 500B of noise figure (NF) versus blocker power for the implementation 400 of FIG. 4 in accordance with one or more implementations of the subject technology. The blocker signal is 25 MHz away from the LO, with a phase noise of −135 dBc/Hz. The post-cancellation noise FIG. 530 corresponding to the plot 520 of FIG. 5A is shown to be up to 19 dB lower than the before-cancellation noise figure of 25 dB corresponding to the plot 510 of FIG. 5A.

Figure 6:
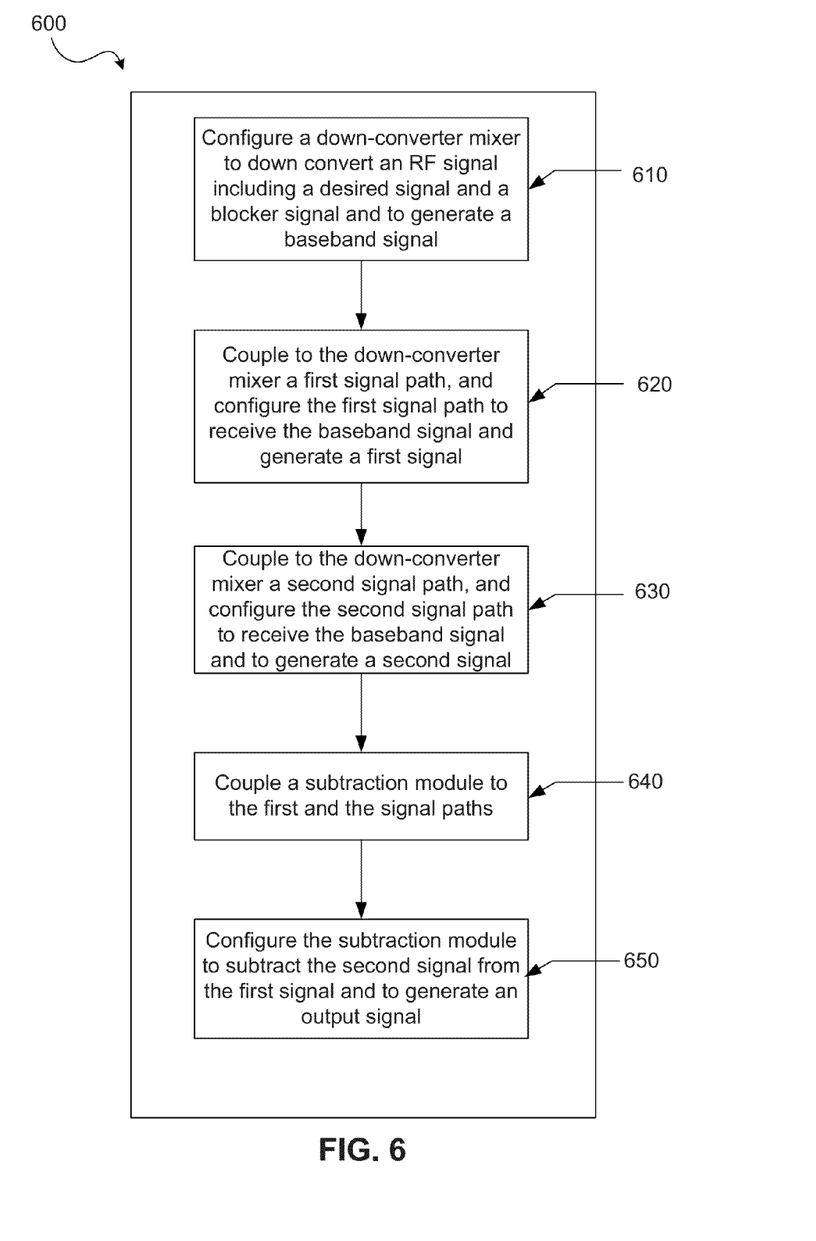
FIG. 6 illustrates a flow diagram of an example method for reciprocal mixing noise cancellation in accordance with one or more implementations.

FIG. 6 illustrates a flow diagram of an example method 600 for reciprocal mixing noise cancellation in accordance with one or more implementations of the subject technology. For explanatory purposes, example method 600 is described herein with reference to the signals 102 and 104 of FIG. 1B and the system 200 of FIG. 2; however, example method 600 is not limited to the signals 102 and 104 and the system 200. Further for explanatory purposes, the blocks of example method 600 are described herein as occurring in serial, or linearly. However, multiple blocks of example method 600 may occur in parallel. In addition, the blocks of example method 600 need not be performed in the order shown and/or one or more of the blocks of example method 600 need not be performed.

Method 600 may start at operation block 610, where a down-converter mixer (e.g., 210 of FIG. 2) may be configured to down convert a radio-frequency (RF) signal (e.g., 102 of FIG. 1B) including a desired signal (e.g., 102 of FIG. 1B) and a blocker signal (e.g., 101 of FIG. 1B), and to generate a baseband signal (e.g., 212 of FIG. 2). A first signal path (e.g., 220 of FIG. 2) may be coupled, at operation block 620, to the down-converter mixer. The first signal path may be configured to receive the baseband signal and generate a first signal (e.g., 232 of FIG. 2).

At operation block 630, a second signal path (e.g., 225 of FIG. 2) may be coupled to the down-converter mixer. The second signal path may be configured to receive the baseband signal and generate a second signal (e.g., 272 of FIG. 2). The second signal path may regenerate the noise that may arise from reciprocal mixing, in a wanted channel, by using the image of the noise due to reciprocal mixing. At operation block 640, a subtraction module (e.g., 280 of FIG. 2) may be coupled to the first and the second signal paths. At operation block 650, the subtraction module may be configured to subtract the second signal from the first signal and to generate an output signal (e.g., 282 of FIG. 2). The second signal may include the reciprocal mixing noise, and the output signal may include the desired signal (e.g., 223 of FIG. 2) substantially free from the reciprocal mixing noise.

Figure 7:
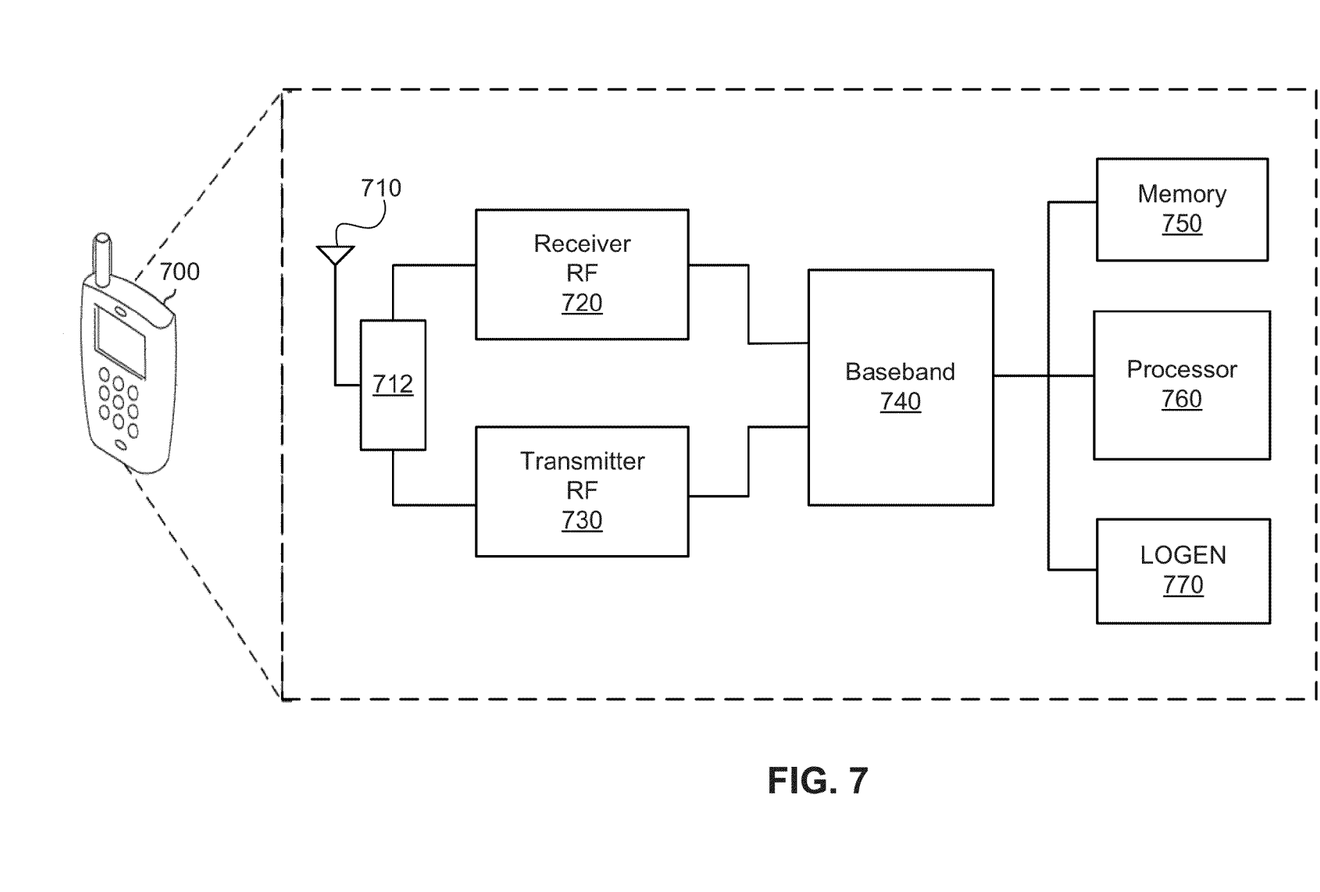
FIG. 7 illustrates an example wireless communication device in accordance with one or more implementations.

FIG. 7 illustrates an example wireless communication device 700 in accordance with one or more implementations of the subject technology. The wireless communication device 700 may comprise a radio-frequency (RF) antenna 710, a receiver 720, a transmitter 730, a baseband processing module 740, a memory 750, a processor 760, and a local oscillator generator (LOGEN) 770. In various embodiments of the subject technology, one or more of the blocks represented in FIG. 7 may be integrated on one or more semiconductor substrates. For example, the blocks 720-770 may be realized in a single chip or a single system on chip, or may be realized in a multi-chip chipset.

The RF antenna 710 may be suitable for transmitting and/or receiving RF signals (e.g., wireless signals) over a wide range of frequencies. Although a single RF antenna 710 is illustrated, the subject technology is not so limited.

The receiver 720 may comprise suitable logic circuitry and/or code that may be operable to receive and process signals from the RF antenna 710. The receiver 720 may, for example, be operable to amplify and/or down-convert received wireless signals. In various embodiments of the subject technology, the receiver 720 may be operable to cancel noise in received signals, in particular, the reciprocal mixing noise, and may be linear over a wide range of frequencies. For example, the receiver 720 may include the main and auxiliary paths described above with respect to FIGS. 2 and 4. In this manner, the receiver 720 may be suitable for receiving signals in accordance with a variety of wireless standards. Wi-Fi, WiMAX, Bluetooth, and various cellular standards. In various embodiments of the subject technology, the receiver 720 may not require sharp RF filters for filtering the blocker signals and oscillators with minimal phase noise, as the reciprocal-mixing noise may be cancelled through combination of signals from the main path and the auxiliary path, as described above with respect to FIGS. 2 and 4.

The transmitter 730 may comprise suitable logic circuitry and/or code that may be operable to process and transmit signals from the RF antenna 710. The transmitter 730 may, for example, be operable to up-convert baseband signals to RF signals and amplify RF signals. In various embodiments of the subject technology, the transmitter 730 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 730 may be operable to provide signals for further amplification by one or more power amplifiers.

The duplexer 712 may provide isolation in the transmit band to avoid saturation of the receiver 720 or damaging parts of the receiver 720, and to relax one or more design requirements of the receiver 720. Furthermore, the duplexer 712 may attenuate the noise in the receive band. The duplexer may be operable in multiple frequency bands of various wireless standards.

The baseband processing module 740 may comprise suitable logic, circuitry, interfaces, and/or code that may be operable to perform processing of baseband signals. The baseband processing module 740 may, for example, analyze received signals and generate control and/or feedback signals for configuring various components of the wireless communication device 700 such as the receiver 720. The baseband processing module 740 may be operable to encode, decode, transcode, modulate, demodulate, encrypt, decrypt, scramble, descramble, and/or otherwise process data in accordance with one or more wireless standards.

The processor 760 may comprise suitable logic, circuitry, and/or code that may enable processing data and/or controlling operations of the wireless communication device 700. In this regard, the processor 760 may be enabled to provide control signals to various other portions of the wireless communication device 700. The processor 760 may also control transfers of data between various portions of the wireless communication device 700. Additionally, the processor 760 may enable implementation of an operating system or otherwise execute code to manage operations of the wireless communication device 700.

The memory 750 may comprise suitable logic, circuitry, and/or code that may enable storage of various types of information such as received data, generated data, code, and/or configuration information. The memory 750 may comprise, for example, RAM, ROM, flash, and/or magnetic storage. In various embodiment of the subject technology, Information stored in the memory 750 may be utilized for configuring the receiver 720 and/or the baseband processing module 740.

The local oscillator generator (LOGEN) 770 may comprise suitable logic, circuitry, interfaces, and/or code that may be operable to generate one or more oscillating signals of one or more frequencies. The LOGEN 770 may be operable to generate digital and/or analog signals. In this manner, the LOGEN 770 may be operable to generate one or more clock signals and/or sinusoidal signals. Characteristics of the oscillating signals such as the frequency and duty cycle may be determined based on one or more control signals from, for example, the processor 760 and/or the baseband processing module 740.

In operation, the processor 760 may configure the various components of the wireless communication device 700 based on a wireless standard according to which it is desired to receive signals. Wireless signals may be received via the RF antenna 710 and amplified and down-converted by the receiver 720. The baseband processing module 740 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 750, and/or information affecting and/or enabling operation of the wireless communication device 700. The baseband processing module 740 may modulate, encode and perform other processing on audio, video, and/or control signals to be transmitted by the transmitter 730 in accordance to various wireless standards.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for cancellation of a reciprocal mixing noise, the system comprising:
   a down-converter mixer configured to down convert a radio-frequency (RF) signal including a desired signal and a blocker signal and to generate a baseband signal, wherein the baseband signal comprises the desired signal at approximately zero frequency overlapped with a spur signal including reciprocal-mixing noise, the blocker signal at a blocker frequency, and an image of the spur signal at a frequency approximately twice the blocker frequency;
   a first signal path configured to receive the baseband signal and to generate a first signal, wherein the first signal path comprises a first low-pass filter (LPF) configured to remove the image of the spur signal, and wherein the first signal comprises the desired signal overlapped with the reciprocal-mixing noise;
   a second signal path configured to receive the baseband signal and to generate a second signal; and
   a subtraction module configured to subtract the second signal from the first signal to generate an output signal, wherein,
   the second signal comprises the reciprocal mixing noise, and
   the output signal comprises the desired signal substantially free from the reciprocal mixing noise.

2. The system of claim 1, wherein the second signal path comprises:
   a high-pass filter (HPF) configured to remove the desired signal overlapped with the spur signal and to pass a first-filtered signal including the blocker signal and an image of the spur signal.

3. The system of claim 2, wherein the subtraction module is configured to subtract the replica of the reciprocal-mixing noise from the first signal to generate the output signal that comprise the desired signal substantially free from the reciprocal-mixing noise.

4. The system of claim 2, wherein the down-converter mixer comprises an M-phase mixer including an 8-phase mixer passive mixer.

5. The system of claim 4, further comprising a harmonic recombination circuit configured to remove unwanted image signals resulting from folding of higher order images caused by the limiter circuit.

6. The system of claim 4, wherein the first signal path comprises:
   a trans-impedance amplifier (TIA) including a feedback resistor, the TIA configured to convert an input current signal to a voltage signal;
   a first LPF including an on-chip passive RC filter; and
   a gain stage including a variable-gain transconductance amplifier (TCA).

7. The system of claim 4, wherein the second signal path comprises:
   a capacitor configured to direct the out-of-band signal to the second signal path;
   a trans-impedance amplifier (TIA) including a feedback resistor, the TIA configured to convert an input current signal to a voltage signal;
   a limiter circuit including a hard-limiting inverter stage configured to ensure proper restoration of an in-band reciprocal mixing;
   a LPF including an on-chip passive RC filter to remove the blocker signal and an image of a replica of the reciprocal-mixing noise; and
   a gain stage including a variable-gain transconductance amplifier (TCA) to generate a replica of the reciprocal-mixing noise.

8. The system of claim 1, wherein the second signal path further comprises a limiter circuit configured to reject an amplitude-modulation (AM) sideband of the first-filtered signal and to preserve phase-modulation (PM) sidebands of the first-filtered signal, wherein the PM sidebands of the first-filtered signal comprise a reduced amplitude replica of the spur signal, and an image of the reduced amplitude replica of the spur signal.

9. The system of claim 1, wherein the second signal path further comprises a second LPF configured to remove the blocker signal and the image of the reduced amplitude replica of the spur signal; and a gain stage configured to amplify the reduced amplitude replica of the spur signal to generate the second signal, wherein the second signal comprises a replica of the spur signal that is a replica of the reciprocal-mixing noise.

10. A method for reciprocal-mixing noise cancellation, the method comprising:
    configuring a down-converter mixer to down convert a radio-frequency (RF) signal including a desired signal and a blocker signal and to generate a baseband signal, wherein the baseband signal comprises the desired signal at approximately zero frequency overlapped with a spur signal including the reciprocal-mixing noise, the blocker signal at a blocker frequency, and an image of the spur signal at a frequency approximately twice the blocker frequency;
    coupling to the down-converter mixer a first signal path, and configuring the first signal path to receive the baseband signal and to generate a first signal, wherein the first signal path comprises a first low-pass filter (LPF)

configured to remove the image of the spur signal, and wherein the first signal comprises the desired signal overlapped with the reciprocal-mixing noise;

coupling to the down-converter mixer a second signal path, and configuring the second signal path to receive the baseband signal and to generate a second signal; and coupling a subtraction module to the first and the second signal paths, and configuring the subtraction module to subtract the second signal from the first signal and to generate an output signal, wherein, the second signal comprises the reciprocal-mixing noise, and the output signal comprises the desired signal substantially free from the reciprocal-mixing noise.

11. The method of claim 10, wherein coupling the second signal path further comprises:

coupling to the down-conversion mixer a high-pass filter (HPF), and configuring the HPF to remove the desired signal overlapped with the spur signal and to pass a first-filtered signal including the blocker signal and an the image of the spur signal.

12. The method of claim 11, wherein further comprising configuring the subtraction module to subtract the replica of the reciprocal-mixing noise from the first signal and to generate the output signal that comprise the desired signal substantially free from the reciprocal-mixing noise.

13. The method of claim 11, wherein coupling the down-converter mixer comprises coupling an M-phase mixer including an 8-phase mixer passive mixer.

14. The method of claim 13, further comprising coupling a harmonic recombination circuit, and configuring the harmonic recombination circuit to remove unwanted image signals resulting from folding of higher order images caused by the limiter circuit.

15. The method of claim 13, wherein coupling the first signal path comprises:

coupling to the down-conversion mixer a trans-impedance amplifier (TIA) including a feedback resistor, and configuring the TIA to convert an input current signal to a voltage signal;

coupling to the TIA a first LPF including an on-chip passive RC filter; and coupling to the first LPF a gain stage including a variable-gain transconductance amplifier (TCA).

16. The method of claim 13, wherein coupling the second signal path comprises:

coupling to the down-conversion mixer a capacitor configured to direct the out-of-band signal to the second signal path;

coupling to the capacitor a trans-impedance amplifier (TIA) including a feedback resistor, and configuring the TIA to convert an input current signal to a voltage signal;

coupling to the TIA a limiter circuit including a hard-limiting inverter stage, and configuring the limiter circuit to ensure proper restoration of an in-band reciprocal mixing;

coupling to the limiter circuit an LPF including an on-chip passive RC filter, and configuring the LPF to remove the blocker signal and an image of a replica of the reciprocal-mixing noise; and coupling to the LPF a gain stage including a variable-gain transconductance amplifier (TCA), and configuring the variable-gain TCA to generate a replica of the reciprocal-mixing noise.

17. The method of claim 10, further comprising coupling to the HPF a limiter circuit and configuring the limiter circuit to reject an amplitude-modulation (AM) sideband of the first-filtered signal and to preserve phase-modulation (PM) sidebands of the first-filtered signal, wherein the PM sidebands of the first-filtered signal comprise a reduced amplitude replica of the spur signal, and an image of the reduced amplitude replica of the spur signal.

18. The method of claim 10, further comprising:

coupling to the limiter circuit a second LPF, and configuring the second LPF to remove the blocker signal and the image of the reduced amplitude replica of the spur signal; and coupling to the second LPF a gain stage, and configuring the gain stage to amplify the reduced amplitude replica of the spur signal and to generate the second signal, wherein the second signal comprises a replica of the spur signal that is a replica of the reciprocal-mixing noise.

19. A receiver system, comprising:

a front-end circuit coupled to a radio-frequency (RF) antenna and configured to receive an RF signal; and a circuit for processing the RF signal to cancel a reciprocal-mixing noise comprising:

a down-converter mixer configured to down convert the RF signal including a desired signal and a blocker signal and to generate a baseband signal, wherein the baseband signal comprises the desired signal at approximately zero frequency overlapped with a spur signal including reciprocal-mixing noise, the blocker signal at a blocker frequency, and an image of the spur signal at a frequency approximately twice the blocker frequency;

a first signal path configured to receive the baseband signal and to generate a first signal, wherein the first signal path comprises a first low-pass filter (LPF) configured to remove the image of the spur signal, and wherein the first signal comprises the desired signal overlapped with the reciprocal-mixing noise;

a second signal path configured to receive the baseband signal and to generate a second signal; and a subtraction module configured to subtract the second signal from the first signal to generate an output signal, wherein, the second signal comprises the reciprocal-mixing noise, and the output signal comprises the desired signal substantially free from the reciprocal-mixing noise.

20. The receiver system of claim 19, wherein:

the second signal path comprises:

a high-pass filter (HPF) configured to remove the desired signal overlapped with the spur signal and to pass a first-filtered signal including the blocker signal and an the image of the spur signal;

a limiter circuit configured to reject an amplitude-modulation (AM) sideband of the first-filtered signal and to preserve phase-modulation (PM) sidebands of the first-filtered signal, wherein the PM sidebands of the first-filtered signal comprise a reduced amplitude replica of the spur signal, and an image of the reduced amplitude replica of the spur signal;

a second LPF configured to remove the blocker signal and the image of the reduced amplitude replica of the spur signal; and a gain stage configured to amplify the reduced amplitude replica of the spur signal to generate the second signal, wherein the second signal comprises a replica of the spur signal that is a replica of the reciprocal-mixing noise; and the subtraction module is configured to subtract the replica of the reciprocal-mixing noise from the first signal to generate the output signal that comprise the desired signal substantially free from the reciprocal-mixing noise.

* * * * *